(12) United States Patent
Cobden et al.

(10) Patent No.: US 8,617,512 B2
(45) Date of Patent: Dec. 31, 2013

(54) WATER GAS SHIFT PROCESS

(75) Inventors: Paul Dean Cobden, Alkmaar (NL);
Stéphane Walspurger, Heiloo (NL);
Rudolf Willem Van Den Brink,
Schagen (NL); **Hendricus Adrianus
Johannes Van Dijk**, Alkmaar (NL)

(73) Assignee: Stichting Energieonderzoek Centrum Nederland, Petten (NL)

( * ) Notice: Subject to any disclaimer, the term of this patent is extended or adjusted under 35 U.S.C. 154(b) by 0 days.

(21) Appl. No.: 13/112,881

(22) Filed: May 20, 2011

(65) Prior Publication Data

US 2011/0293509 A1    Dec. 1, 2011

Related U.S. Application Data

(63) Continuation-in-part of application No. PCT/NL2009/050709, filed on Nov. 23, 2009.

(30) Foreign Application Priority Data

Nov. 21, 2008    (NL) ...................................... 1036224

(51) Int. Cl.
*C01B 3/12*    (2006.01)
*C01B 3/38*    (2006.01)

(52) U.S. Cl.
USPC .......................................... 423/655; 252/373

(58) Field of Classification Search
USPC ....................................................... 423/655
See application file for complete search history.

(56) References Cited

U.S. PATENT DOCUMENTS

| 4,002,720 | A | | 1/1977 | Wheelock et al. |
| 4,536,382 | A | * | 8/1985 | Blytas ........................ 423/437.2 |
| 5,358,701 | A | | 10/1994 | Pinnavaia et al. |
| 6,245,221 | B1 | * | 6/2001 | Baird et al. .................. 208/213 |
| 6,322,612 | B1 | | 11/2001 | Sircar et al. |
| 7,354,562 | B2 | * | 4/2008 | Ying et al. ................. 423/437.2 |
| 2004/0081614 | A1 | | 4/2004 | Ying et al. |
| 2007/0178035 | A1 | * | 8/2007 | White et al. .................. 423/248 |

FOREIGN PATENT DOCUMENTS

| WO | WO-03/020406 A2 | 3/2003 |
| WO | WO-2005/102916 A2 | 11/2005 |
| WO | WO-2008-068305 A2 | 6/2008 |

OTHER PUBLICATIONS

Descamps, et al., "Efficiency of an Integrated Gasification Combined Cycle (IGCC)power plant including $CO_2$ removal", Energy 33 (2008)874-881, XP022634870.

(Continued)

*Primary Examiner* — Melvin C Mayes
*Assistant Examiner* — Kenneth Vaden
(74) *Attorney, Agent, or Firm* — Gilberto M. Villacorta; Sunit Talapatra; Foley & Lardner LLP

(57) ABSTRACT

The invention provides a water gas shift process comprising a reaction stage. The reaction stage comprises (a) providing a gas mixture comprising CO, $H_2O$ and an acid gas component to a reactor containing an adsorbent, and (b) subjecting the gas mixture to water gas shift reaction conditions to perform the water gas shift reaction. The adsorbent comprises an alkali promoted alumina based material. The acid gas component comprises $H_2S$.

11 Claims, 6 Drawing Sheets

(56) References Cited

OTHER PUBLICATIONS

Ko, et al., "A study of Zn-Mn based sorbent for the high temperature removal of $H_2S$ from coal-derived gas", Journal of Hazardous Materials, 147 (2007) 334-341, XP022385524.

Wakker, et al., "High Temperature $H_2S$ and COS Removal with MnO and FeO on $\gamma$-$Al_2O_3$ Acceptors", Ind. Eng. Chem. Res. vol. 32, No. 1, 139-149, Jan. 1993, XP002538496.

Search Report dated Jan. 26, 2010 in International Application No. PCT/NL2009/050709.

Maurstad, O. et al. "Impact of coal quality and gasifier technology on IGCC performance", 8th International Conference on Greenhouse Gas Control Technology, Trondheim, 2006 (Abstract).

\* cited by examiner

WATER GAS SHIFT PROCESS

CROSS REFERENCE TO RELATED APPLICATIONS

This application is a Continuation-In-Part of PCT/NL2009/050709, filed Nov. 23, 2009, incorporated herein by reference in its entirety. Netherlands Priority Application 1036224, filed Nov. 21, 2008 including the specification, drawings, claims and abstract, is incorporated herein by reference in its entirety.

FIELD OF THE INVENTION

The invention relates to a water gas shift (WGS) process. The invention further relates to the use of an alkali promoted alumina based material (as adsorbent) for the removal of (multiple) acid gas components from a gas mixture.

BACKGROUND OF THE INVENTION

The use of adsorbents to remove $SO_2$ from certain gas streams is known in the art. For instance, U.S. Pat. No. 5,358,701 describes a process for removing noxious sulphur oxides, nitrous oxides, and chlorine from gas streams, particularly from flue gases of coal-burning power plants, using layered double hydroxide (LDH) sorbents. The sorbents are particularly useful for $SO_2$ absorption at temperatures in the range of 100° C. to less than 400° C. The $SO_2$ gas absorbs into the hydrotalcite structure as $SO_3^{2-}$ anions by replacing most of the gallery $CO_3^{2-}$ anions. The adsorbed $SO_2$ is driven-off by calcination at elevated temperatures (500° C.) and the LDH sorbents are regenerated by hydrolyzing the calcined product optionally in the presence of $CO_2$ or $CO_3^{2-}$.

Further, methods to fixate carbon dioxide are also known in the art. WO 2005/102916 for instance, describes apparatus and methods for converting hydrocarbon fuels to hydrogen-rich reformate that incorporate a carbon dioxide fixing mechanism into the initial hydrocarbon conversion process. The mechanism utilizes a carbon dioxide fixing material within the reforming catalyst bed to remove carbon dioxide from the reformate product. The removal of carbon dioxide from the product stream shifts the reforming reaction equilibrium toward higher hydrocarbon conversion with only small amounts of carbon oxides produced. Fixed carbon dioxide may be released by heating the catalyst bed to a calcination temperature. A non-uniform distribution of catalysts and carbon dioxide fixing material across catalyst bed yields higher conversion rates of hydrocarbon to hydrogen-rich reformate.

US 2004/081614 describes a process for producing a high temperature $CO_x$-lean product gas from a high temperature $CO_x$-containing feed gas, which includes providing a sorption enhanced reactor containing a first adsorbent, a shift catalyst and a second adsorbent; feeding into the reactor a feed gas containing $H_2$, $H_2O$, CO and $CO_2$; contacting the feed gas with the first adsorbent to provide a $CO_2$ depleted feed gas; contacting the $CO_2$ depleted feed gas with the shift catalyst to form a product mixture comprising $CO_2$ and $H_2$; and contacting the product mixture with a mixture of second adsorbent and shift catalyst to produce the product gas, which contains at least 50 vol. % $H_2$, and less than 5 combined vol. % of $CO_2$ and CO. The adsorbent is a high temperature adsorbent for a Sorption Enhanced Reaction process, such as $K_2CO_3$ promoted hydrotalcites, modified layered double hydroxides, spinels, modified spinels, and magnesium oxides.

U.S. Pat. No. 6,322,612 describes a pressure or vacuum swing adsorption process and apparatus used for the separation and recovery of certain gaseous components, such as carbon dioxide from hot gas mixtures containing water vapour. The process comprises introducing the feed gas mixture at an elevated temperature into a feed end of an adsorber column containing an adsorbent. The adsorbent preferentially adsorbs at least one adsorbable component. An adsorber effluent, depleted of the at least one adsorbable component, is withdrawn from a product end of the adsorber column. The adsorber column is depressurized below atmospheric pressure and then purged with steam to withdraw an effluent comprising a mixture of the at least one adsorbable component and $H_2O$. Next, the adsorber column is pressurized by introducing a gas that is depleted of the at least one adsorbable component. The steps are repeated in a cyclic manner.

Further, Descamps et al (Energy 33 (2008)874-881)) and Maurstad (8$^{th}$ International Conference on Greenhouse Gas Control Technology, Trondheim, 2006 ("Impact of coal quality and gasifier technology on IGCC performance" (Abstract)) describe the removal of $CO_2$ and $H_2S$ from coal derived syngas, wherein in the former $H_2S$ is removed at ambient temperatures to provide a clean water gas shift (WGS) gas, followed by the WGS reaction in several reactors, and followed by $CO_2$ removal at ambient temperatures, and wherein in the latter a sour-gas WGS is performed in several reactors, and wherein thereafter $H_2S$ and $CO_2$ are removed at ambient temperatures.

SUMMARY OF THE INVENTION

It is an aspect of the invention to provide an alternative water gas shift process, which preferably further at least partly obviates one or more drawbacks of prior art processes. Preferably, such process may be performed in a single reactor, preferably even in a single bed, with optionally even the absence of conventional WGS catalysts.

A disadvantage of prior art processes may be that for performing the WGS process from a gas that (also) comprises $H_2S$, $H_2S$ has to be removed from the WGS inlet gas (or starting mixture) and/or from the WGS outlet gas (or product gas), which may require a plurality of reactors. Further, a disadvantage of prior art processes may be that conventional WGS catalysts are necessary, in addition to optional $CO_2$ adsorbents, which may also require a plurality of reactors and/or a plurality of (mixed) beds.

Therefore, in a first aspect, the invention provides a water gas shift process comprising a reaction stage comprising (a) providing a gas mixture comprising CO, $H_2O$ and an acid gas component to a reactor containing an adsorbent, wherein the adsorbent comprises an alkali promoted alumina based material, and (b) subjecting the gas mixture to water gas shift reaction (WGSR) conditions to perform the water gas shift reaction, wherein the acid gas component may comprise $H_2S$, and wherein the gas mixture may comprise a $H_2S$ reactor inlet concentration of at least about 200 ppm $H_2S$ relative to the gas mixture, more especially at least about 500 ppm. Characteristic ranges will be about 200-20.000 ppm, such as 500-20.000 ppm $H_2S$.

As commonly appreciated, a "water gas shift mixture", i.e. the feed gas to the process of the invention, is a gas mixture containing substantial levels of CO and $H_2O$. In particular, the level of CO in the feed gas is at least 2 vol. %, especially at least 5 vol. %, and the molar concentration (or the proportion by volume) of $H_2O$ is preferably at least 1.5 times, more preferably at least 2-times the concentration level of CO. In the product gas of the WSGR, which is the gas issuing from for the present process, the level of $H_2$ is higher than in the feed gas, and levels of CO and $H_2O$ are lower than in the feed gas. In a preferred embodiment, the product gas contains at least 50 vol. % of $H_2$ and less than 5 vol. % of the total of CO and $CO_2$.

It surprisingly appears that the adsorbent may be suitable for the abatement (capture) of $CO_2$ and $H_2S$ in the gas, while on the other hand, the adsorbent may also have suitable water gas shift (WGS) activity. Hence, the adsorbent may be used as coadsorber of two or more acid gas components and/or for the catalysis of the WGS reaction.

An advantage of the process of the invention may be that this process may be applied in one single reactor and optionally even with one single bed. Hence, in an embodiment, the reaction stage is performed in a single reactor and especially in a single bed. A further advantage of the process may be that the adsorbent may easily be regenerated, i.e. the adsorption of $CO_2$ and $H_2S$ is reversible. Via (partial) pressure swing and/or temperature swing, the adsorbent may be regenerated. Hence, in an embodiment the process further comprises an adsorbent regeneration stage, wherein $CO_2$ and optionally the acid gas component are at least partially removed from the adsorbent. Therefore, the invention also provides a cyclic process comprising a plurality of alternating reaction stages and regeneration stages.

Hence, advantages of the invention may be that no specific catalyst may be needed but only a sorbent, and nevertheless WGS is performed, and/or the co-capture of $CO_2$ with $H_2S$ and optionally other acid gases may be possible. Thereby, potentially costs related with traditional gas cleaning sections may be avoided.

The term "adsorbent" may also indicate a combination of adsorbents.

In a specific embodiment, the adsorbent (comprising an alkali promoted alumina based material) comprises one or more alkali-promoted aluminas, wherein alkali is an element selected from the group consisting of K, Na, Li, Cs, and Rb. Especially, the alkali content is ≥5 wt. % calculated as carbonate, preferably 5-30 wt. % calculated as carbonate, relative to the total amount of the alkali promoted alumina.

In yet another embodiment, the adsorbent comprises one or more promoted alkali-promoted aluminas, wherein alkali is an element selected from the group consisting of K, Na, Li, Cs, and Rb ("first promoter"). Especially, the alkali content is ≥5 wt. % calculated as carbonate, preferably 5-30 wt. % calculated as carbonate, relative to the total amount of the alkali promoted alumina.

The alkali-promoted alumina may be further promoted, and is then indicated as "promoted alkali-promoted alumina". The alkali-promoted alumina may be further promoted with one or more elements selected from the group consisting of Mg, Mn, Ti, Ag, Cu, Co, Pb, Fe and Cd ("second promoter"). The alumina may be promoted first with the first promoter and thereafter with the second promoter, but in another embodiment, the alumina may also be promoted first with the second promoter and thereafter with the first promoter; in yet another embodiment, the alumina is promoted with the first and second promoter substantially at the same time. Especially, the promoter (second promoter) content is about 5 wt. % or more calculated as oxide, preferable about 5-50 wt. % calculated as oxide, relative to the total weight of the promoted alkali-promoted aluminas. Preferably, Mg, Mn or Fe are used as promoter (i.e. second promoter).

In a further specific embodiment, the adsorbent comprises one or more alkali-promoted hydrotalcites, wherein alkali is an element selected from the group consisting of K, Na, Li, Cs, and Rb. The hydrotalcite (herein also indicated as "HTC") may have the chemical formula:

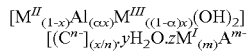
$$[M^{II}_{(1-x)}Al_{(\alpha x)}M^{III}_{((1-\alpha)x)}(OH)_2]$$
$$[(C^{n-})_{(x/n)} \cdot yH_2O \cdot zM^{I}_{(m)}A^{m-}$$

wherein $M^{I}$ is one or more selected from the group consisting of Li, Na, K, Rb and Cs;

$M^{II}$ is one or more selected from the group consisting of Mg, Mn, Cu, Co, Fe, Cd and Cr;

Al is aluminium;

$M^{III}$ is optionally one or more of the group consisting of Fe, Cr and Mn;

$C^{n-}$ is one or more anions selected from the group consisting of $NO_3^-$, $SO_4^{2-}$, $CO_3^{2-}$, $CH_3CO_2^-$, $Cl^-$, $Br^-$, $F^-$ and $I^-$;

$A^{m-}$ is one or more anions, such as selected from $CO_3^{2-}$, $CH_3CO^{2-}$, $C_2O_4^{2-}$, $NO_3^-$, $SO_4^{2-}$, $CO_3^{2-}$, $CH_3CO_2^-$, $OH^-$, $Cl^-$, $Br^-$, $F^-$ and $I^-$ etc. . . . .

n=1 or 2; x=0.01-0.99; y=0-4; z=0.001-7; and α=0.5-1.

Preferably, the alkali promoter is an element selected from the group consisting of K, Na, Li, Cs, and Rb. Especially, the alkali promoter content is ≥5 wt. % calculated as carbonate, preferably 5-30 wt. % calculated as carbonate, relative to the total amount of the alkali promoted hydrotalcite. The value of z is preferably at least about 0.033 and in another embodiment preferably not more than about 0.17.

Especially, the adsorbent may comprise an alkali promoted hydrotalcite, such as potassium promoted hydrotalcite. Hydrotalcite may for instance be promoted with $K_2CO_3$. In such embodiment, $K_2CO_3$ is applied as source of promoter material to promote the hydrotalcite.

Preferably, the molar ratio $M^{II}$:(Al+$M^{III}$) is in the range of about 0:1-1:0, preferable 30:70-70:30. The actual oxidation state of some of the $M^{II}$ and $M^{III}$ ions can be changed during operation, e.g. $Fe^{II}$ and $Fe^{III}$ exist. Further, Al can be the only element present with 3+ oxidation state (α=1). Further, the elements with a 3+ oxidation state, can be a mixture of $Al^{3+}$ and $M^{III}$, such as $Fe^{III}$, $Cr^{III}$ and $Mn^{III}$. The molar ratio of $Al^{3+}$:$M^{3+}$ is preferably 1:1-1:0 (i.e. 0.5≤α≤1).

It surprisingly appears that relatively low x values are especially advantageous. Especially in view of stability under reaction conditions, x is in the range of 0.33-0.55, preferably in the range of 0.4-0.5. Hence, preferably the hydrotalcite material is low in magnesium.

Especially preferred systems are $Mg_{1-x}Al_{(x)}(OH)_2(CO_3)_{x/2} \cdot z[K_2CO_3]$, wherein x and z have the above indicated ranges (α is in this embodiment 1).

Herein, hydrotalcite is indicated as alumina based material, since, under the reaction conditions, hydrotalcite is at least partly converted to a mixed-metal oxide comprising alumina (more precisely, promoted alumina). $M^{I}$ can be considered as first promoter and $M^{II}$ and $M^{III}$ can be considered as second promoter.

Therefore, in the invention a promoted alumina based material may be used as adsorbent. The promoter(s) may be selected from the group consisting of K, Na, Li, Cs, Rb, Mg, Mn, Ti, Ag, Cu, Co, Pb, Fe and Cd. More than one type of promoter may be applied. Especially, the adsorbent comprises a promoted alkali promoted alumina based material, wherein the alumina based material is promoted with one or more first promotors selected from the group consisting of K, Na, Li, Cs, and Rb, and one or more second promotors selected from the group consisting of Mg, Mn, Ti, Ag, Cu, Co, Pb, Fe and Cd. It appears that the second promoter advantageously (further) promotes $CO_2$ capture by the adsorbent. Alternatively or additionally, the adsorbent comprises the alkali promoted hydrotalcite, as defined above.

An advantage of hydrotalcite materials over aluminas is that it appears that the regeneration of the HTC materials seems easier. Hence, HTC materials may have a longer lifetime and/or be cheaper in maintenance costs and/or have a higher acid gas adsorption capacity in cost effective regenerative conditions. It further seems to appear that the promoted HTC adsorbentia, especially those low in magnesium content, may be used without an additional (conventional) WGS catalysts. Hence, the promoted hydrotalcite material alone may have the function of adsorbent and catalyst.

The phrase "one or more alkali-promoted aluminas" (or alumina-based material) (thus) indicates that in an embodiment a mixture of differently promoted aluminas etc. may be applied. The phrase "wherein alkali is an element selected from the group consisting of K, Na, Li, Cs, and Rb" indicates that the alumina etc. may be promoted with one or more types of alkali elements. Likewise, this applies to promoted alkali-promoted aluminas etc. Further, the phrase "promoted with one or more elements selected from the group consisting of Mg, Mn, Ti, Ag, Cu, Co, Pb, Fe and Cd", and similar phrases, indicates that the (promoted) alumina etc. may be promoted with one or more types of these elements. Preferably, one or more of Mg, Fe and Mn are used as promoter (i.e. second promoter). Preferably, Fe is used as promoter (i.e. second promoter). More preferably, Mg, and Mn are used as promoter (i.e. second promoter), yet even more preferably, Mg.

The terms "alkali-promoted alumina", "promoted alkali-promoted alumina", and "alkali-promoted hydrotalcite" may also include a thermally treated alkali-promoted alumina, thermally treated promoted alkali-promoted alumina, and thermally treated alkali-promoted hydrotalcite, respectively. The thermal treatment may be performed before use as adsorbent or under the reaction conditions to perform the method of the invention (see also below).

Promoting the materials may be performed by mixing or impregnation of a salt of the alkali (and/or other) element with the alumina based material and thermally treating the product thus obtained. Suitable salts are hydroxides, carbonates, nitrates, halides, oxalates etc., especially carbonates. As mentioned above, the thermal treatment may in an embodiment be performed in the reactor for performing the method of the invention.

Yet a further advantage may be that the invention may allow the use of coal-derived syngas (synthesis gas) as feed to the WGS reactor, whereas in prior art (sweet shift) processes, coal derived syngas could not easily, or could not be used at all without further measures, as WGS reactor inlet gas. Surprisingly, no substantial sulphur deactivation, such as by $H_2S$, may take place, and thus no pre-desulphurization step may be necessary (although such pre-desulphurization is not excluded in an embodiment).

The terms "reactor inlet gas" or "WGS reactor inlet gas" refer to the gas (and optionally its composition) that is provided to the reactor. In principle, different components of the gas mixture might be provided within the reactor via different inlets. Therefore, the term "reactor inlet gas" or "WGS reactor inlet gas" refer to the gas (and optionally its composition) not yet adsorbed and/or reacted (including subjecting to the WGS conditions) according to the invention; or, in other words, the terms "reactor inlet gas" or "WGS reactor inlet gas" can also be indicated as starting mixture.

The terms "coal-derived syngas" or "coal-derived synthesis gas" refer to synthesis gas derived from coal gasification, and which especially includes sulphur compounds, such as $H_2S$. The phrase "not yet adsorbed and/or reacted" does not exclude that before entering a reactor wherein the method of the invention is performed, the gas may have been subjected to other reactions, such as in a pre-shift reactor.

This acid gas component may further (thus in addition to $H_2S$) comprise one or more components selected from the group consisting of HCN, COS, $CS_2$, $NO_x$, $SO_x$ and HCl. The total acid gas component concentration (not including $CO_2$) may be in the range of about 200-50.000 ppm, such as 500-50.000 ppm. In this concentration, $CO_2$ is not included; $CO_2$ may be present in an amount ranging from for instance 5000-500000 ppm.

Although the adsorbent may be the sole adsorbent-catalyst system within the reactor, optionally the reactor may further contain a (conventional) water gas shift catalyst, wherein preferably the weight ratio of the adsorbent to catalyst is about ≥5, even more preferably about ≥20. For instance, the weight ratio may be in the range of about 5-50, such as about 5-20, especially about 10-20, or in the range of about 20-100, such as 20-50, especially about 25-50. However, in a specific embodiment, the reactor does not contain a further (WGS) catalyst (in addition to the adsorbent as defined herein).

According to a further aspect, the invention provides the use of an alkali promoted alumina based material (as adsorbent) for the removal of acid gas components of a gas mixture comprising acid gas components, wherein the acid gas components comprise (a) a sulphur containing compound selected from the group consisting of $H_2S$, COS, $CS_2$ and $SO_x$ and (b) another compound selected from the group consisting of HCN, $NO_x$ and HCl. More especially, the invention provides the use of an alkali promoted alumina based material for the removal of acid gas components of a gas mixture comprising acid gas components, wherein the acid gas components comprise $H_2S$ and one or more components selected from the group consisting of $H_2S$, $CO_2$, HCN, COS, $CS_2$, $NO_x$, $SO_x$ and HCl. Especially, the acid gas components at least comprise $H_2S$ and $CO_2$. Hence, the adsorbent comprising the alkali promoted alumina based material may be used as co-adsorbent.

After having removed the acid gas components, the gas mixture (thus provided) may be used for a Fischer-Tropsch reaction but also for other processes. The reaction mixture, enriched in $H_2$, may thus be provided to a further reactor, which may for instance be a Fischer-Tropsch reactor, or a gas turbine for combustion, or a methanol synthesis reactor, or a CO preferential oxidizer for low-grade $H_2$ production lean in CO+$CO_2$, or a PSA (pressure swing adsorber) system for high grade $H_2$ production, or a methanol production unit, or an ammonia synthesis reactor, etc. Note that the term "remove" here refers to reducing or abating, and does not necessarily imply the complete removal of one or more acid gas components.

Hence, especially the gas mixture further comprises CO and $H_2O$, and the alkali promoted alumina based material may further also be used for the simultaneous removal of $H_2S$ and $CO_2$ and the water gas shift reaction of CO and $H_2O$ from the gas mixture. Especially, the gas mixture may comprise coal derived syngas, to which $H_2O$ is added or has been added.

The term "$NO_x$" relates to compounds wherein x is equal to or larger than 1, such as NO, $N_2O_3$, $NO_2$, $N_2O_4$, $N_2O_5$, etc., especially at least NO and/or $NO_2$. The term "$SO_x$" relates to compounds wherein x is equal to or larger than 1, such as SO, $S_2O_2$, $SO_2$, $SO_3$, $S_6O_2$, $S_7O_2$, etc., especially at least $SO_2$.

BRIEF DESCRIPTION OF THE DRAWINGS

Embodiments of the invention will now be described, by way of example only, with reference to the accompanying schematic drawings in which corresponding reference symbols indicate corresponding parts, and in which.

DESCRIPTION OF PREFERRED EMBODIMENTS

Figure 1:
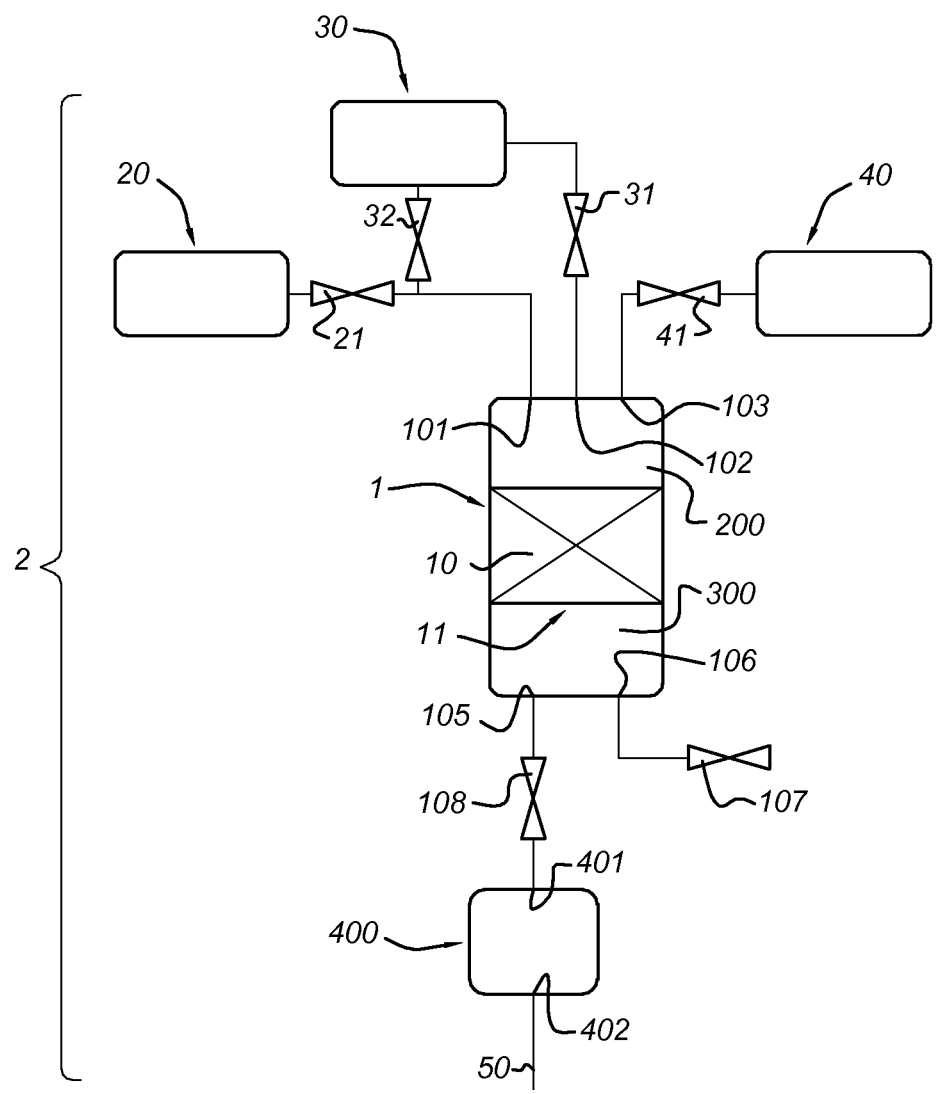
FIG. 1 schematically depicts an embodiment of an arrangement comprising a reactor for performing the process of the invention.

FIG. 1 schematically depicts an arrangement 2 comprising an embodiment of a reactor 1 for performing the process of the invention. The reactor 1 in this embodiment encloses a single bed 11, which comprises an adsorbent 10 (and optionally a catalyst). Within this reactor 1, at least part of the process of the invention may be applied, especially at least the water gas shift reaction (WGSR) (i.e. the herein indicated reaction stage is especially performed within the reactor 1). The process of the invention is however not confined to the herein schematically depicted arrangement 2 and the schematically depicted reactor 1. Further, the term reactor may also relate to a plurality of reactors, which may especially be arranged parallel. Therefore, also the term "single reactor" may relate to a plurality of reactors arranged in parallel.

The process that may be applied, the water gas shift process, may comprise a reaction stage comprising (a) providing a gas mixture 200 comprising CO, $H_2O$ and an acid gas component to reactor 1 containing adsorbent 10 and (b) subjecting the gas mixture 200 to water gas shift reaction conditions to perform the water gas shift reaction.

The adsorbent 10 may comprise an alkali promoted alumina based material, such as potassium promoted alumina. Alumina may for instance be promoted with $K_2CO_3$. The term "promoted" relates to the intimate mixture of a compound with another compound that acts like a promoter. Alumina may for instance be promoted with $K_2CO_3$ by mixing an (aqueous) slurry of both components and removing water by drying, and optionally calcining the dried product. Other alkali promoted alumina based materials may for instance comprise sodium or lithium promoted aluminas. The alumina may for instance comprise a alumina, but may also comprise gibbsite or gamma alumina.

The adsorbent 10 may also comprises an alkaline earth alkali promoted alumina. This may imply that in addition to promotion with the alkali element, also the alumina is promoted with the alkaline earth element (sometimes also indicated as "earth alkaline element"). Especially, the adsorbent 10 may comprise a magnesium alkali promoted alumina. For instance, the alumina may be potassium and magnesium promoted. Alumina may for instance be promoted with $K_2CO_3$ and $Mg(NO_3)_2$ by mixing an (aqueous) slurry of both components and removing water by drying, and optionally calcining the dried product. Other alkali and alkaline earth promoted aluminas may for instance comprise aluminas promoted with one or more of potassium, sodium or lithium and promoted with one or more of magnesium, (calcium) strontium and barium. The promotion can be performed with most commonly available salt of the promoters, not necessarily carbonates, or oxides, as these may be formed under reaction conditions in any case.

Yet in addition, the adsorbent 10 may comprise a transition metal promoted alumina. Hence, the alumina may not only be promoted with an alkali element, and optionally with an alkaline earth element, but may optionally also be promoted with a transition metal element. Such transition metal element may be selected from the groups 3-12, especially from the groups 6-11, such as for instance one or more of Mn, Fe, Co, Ni, Cu and Zn.

Especially, the adsorbent 10 may comprise a promoted layered double hydroxide (LDH), especially alkali promoted layered double hydroxide, and even more especially the adsorbent 10 comprises a promoted hydrotalcite, especially alkali promoted hydrotalcite.

The term "the product of a thermally treated" relates to a product that has been heated at a temperature above about 200° C., even more especially above about 400° C. For instance, assuming a hydrotalcite, when heating this hydrotalcite in the reactor before the WGS reaction or during the WGS reaction, the hydrotalcite modifies to a promoted alumina, such as $K_2CO_3$ and MgO promoted alumina, since at elevated temperatures, the hydrotalcites may at least partially rearrange in mixed oxides while loosing hydrotalcite crystalline structure hydrotalcites and layered double hydroxide. This is well known in the art and is for instance described in U.S. Pat. No. 5,358,701, U.S. Pat. No. 6,322,612 and WO 2005/102916.

The term "metal promoted compound" refers to compounds to which these metals, in any form, are attached and/or included. The metal will in general be present on the compound as oxide and/or as hydroxide. The difference between a mixed bed of a catalyst of a metal oxide and a compound is that such mixed bed may essentially consist of discrete particles (especially granules or extrudates) of the metal oxide and of the compound (respectively), whereas when a promoted compound is used in a (single) bed, the bed will essentially consist of particles (especially granules or extrudates) which comprise an intimate mixture of the compound and its promoter(s).

In an embodiment, the acid gas component may comprises $H_2S$, but may also (alternatively or additionally) comprise one or more components selected from the group consisting of HCN, COS, $CS_2$, $NO_x$, $SO_x$ and HCl. The gas mixture 200 comprising the starting components CO and $H_2O$ (for the WGSR) and the acid gas components may be introduced to the reactor 1 via one or more inlets. In an embodiment, a mixture comprising at least CO and $H_2S$ originates from a first supply 20, for instance from a coal gasifier, an oil gasifier, a petcoke gasifier, a natural gas reformer, from biomass gasification, etc. can be introduced to a first inlet 101 to the reactor 1. $H_2O$, for instance from a second supply 30, can be added to this mixture, either via the same supply line, such that the compete gas mixture is introduced at inlet 101, or via a separate supply line, such that $H_2O$ may be introduced at a second inlet 102 in the reactor 1. The supply of the gas mixture 200 or gas components from first and second supplies 20, 30 may be controlled by for instance valves 21 and 32, respectively. The gas mixture 200 before a reaction and before adsorption in the reactor 1 has a composition, which can be predetermined, and which composition is also indicated as "inlet composition".

The complete gas mixture 200 may be introduced via one supply line into reactor 1. For instance, the gas mixture may originate from supply 20. However, one or more of the components may also be introduced to a gas mixture comprising at least CO and $H_2S$ before entering the reactor, such as in the example above wherein $H_2O$ is introduced in the gas mixture from supply 30 via valve 32. Alternatively or additionally, one or more components of the gas mixture 200 may also be introduced to the reactor separate from the mixture 200 comprising at least CO and $H_2S$, such as in the example above wherein $H_2O$ is introduced in the gas mixture from supply 30 via valve 31. Optionally, (further) gas components of the gas mixture 200 may also be introduced from a third supply 40, which may be introduced for instance in reactor 1 via opening 103 (and optional valve 41). Such further supply 40 may also for instance be used to provide gasses for pressure swing, like steam (see also below). Alternatively, gasses for pressure swing can be provided counter current to the feed stream 20.

Below, some characteristic compositions and some example compositions (including example conditions) are indicated:

TABLE 1 characteristic compositions and example compositions

|  | comp. 1 | comp. 2 | Ex. 1 | Ex. 2 | Ex. 3 | Ex. 4 | Ex. 5 | Ex. 6 |
|---|---|---|---|---|---|---|---|---|
| $CO_2$ (vol %) | 1 | 24 | 24 | 24 | 24 | 24 | — | 24 |
| CO (vol %) | 29 | 6 | — | — | — | 6 | 6 | 6 |
| $H_2S$ (vol %) | 0.2 | 0.2 | 0.2 | 0.2 | 0.1 | 0.2 | — | 0.2 |
| $H_2$ (vol %) | 12 | 35 | — | — | — | 35 | 12 | 35 |
| $H_2O$ (vol %) | 57 | 34 | 34 | 34 | 34 | 34 | 34 | 34 |
| Ar (vol %) | 0.8 | 0.8 | 42 | 42 | 42 | 0.8 | 48 | 0.8 |
| P (bar) | 20/40 | 20/40 | 2 | 5 | 5 | 5 | 5 | 5 |
| T (° C.) | 300-500 | 300-500 | 400 | 400 | 400 | 400 | 400 | 400 |
| Fig. |  |  | 2a | 2b | 2c | 2d | 2e | 2f |
| K-hydro-talcite |  |  | + | + | + | + | + | − |
| K-alumina |  |  | − | − | − | − | − | + |

Examples 1-5 relate to potassium promoted hydrotalcite, $Mg_{0.81}Al_{0.19}(OH)_2(CO_3)_{0.095}.0.13[K_2CO_3]$ and example 6 relates to K promoted alumina, $Al_2O_3.0.185[K_2CO_3]$. The first comparative example (comp. 1) indicates a gas composition comparable to a coal derived syngas at the inlet of pre-shift section (or without pre-shift section). The second comparative example (comp. 2) shows a gas composition comparable to a coal derived syngas at the outlet of pre-shift section (or with pre-shift section).

The gas mixture 200 may comprise a $H_2S$ reactor inlet concentration of at least 200 ppm, especially at least about 500 ppm $H_2S$ relative to the gas mixture 200. In a specific embodiment, the gas mixture 200 comprises coal-derived synthesis gas.

The gas mixture 200 is fed to reactor 1 (or is composed at the inlets) and is subjected to water gas shift conditions (also indicated herein as WGSR conditions). This may mean introducing a predetermined amount of $H_2O$ such that the WGSR may take place, providing the gas mixture 200 an elevated temperature or bringing the gas mixture 200 to an elevated temperature (in the reactor 1), wherein the elevated temperature is preferably at least about 300° C., even more preferably at least about 400° C., and further preferably below about 700° C., even more preferably below about 650° C., such as equal to or below about 600° C. Advantageously, it appears that the adsorbent alone already provides the WGS reaction in addition to the advantageous adsorption of $CO_2$ (i.e. sorption enhanced WGS) and in addition to the advantageous $H_2S$ and/or other acid gas component adsorption. Hence, subjecting the gas mixture 200 to water gas shift reaction conditions to perform the water gas shift reaction may comprise subjecting the gas mixture 200 to a temperature in the range of 300-600° C.

The adsorbent 10 may be comprised in one or more beds 11; the schematic picture indicates one single bed 11. Further, additional catalyst may be present, in other beds or mixed with the adsorbent 10. When the reactor 1 further contains a WGS catalyst, the weight ratio of the adsorbent 10 to the catalyst is preferably ≥5. Conventional WGS catalysts are for instance Iron-Chromium based catalyst, high temperature shift catalysts, Copper-Zinc-Aluminium mixed oxide catalysts, low temperature shift catalysts, sulphided Cobalt Molybdenum catalysts, sour shift catalysts or any noble metal based catalyst. However, in a specific embodiment, the reactor 1 only contains the adsorbent 10 as active species (i.e. here adsorbent and WGS catalyst). Thus, in a specific embodiment, the reactor 1 does not contain a further catalyst (and/or no other adsorbent). Hence, in a specific embodiment, the reaction stage is performed in a single reactor 1, preferably in a single bed 11.

In this way, a water gas shifted reaction mixture is provided, indicated with reference 300. The reaction mixture 300, enriched in $H_2$, may be provided to a further reactor, here indicated as second reactor 400, which may for instance be a Fischer-Tropsch reactor or a gas turbine for combustion or a methanol synthesis reactor, or a CO preferential oxidizer for low-grade $H_2$ production lean in CO+$CO_2$, or a PSA (pressure swing adsorber) system for high grade $H_2$ production, or a methanol production unit, or an ammonia synthesis reactor, etc. Products thereof, indicated with reference 402, may be released from the second reactor 50 via outlet 402. Reference 105 indicates an opening or outlet in the reactor 1, arranged to be in gaseous communication with the optional second reactor 400. A valve 108 may be present in the gas channel between the reactor 1 and the optional second reactor 400. Optional second reactor 400 may have an opening or inlet 401, arranged to be in gaseous contact (via the gas channel) with the reactor 1.

An advantage of the application of the invention may also be for instance that the downstream reactors for $H_2$ production may be smaller (such as a methanator, PrOx, PSA) and/or that the $H_2$ purity can be increased because the present invention already removes significant amounts of impurities ($CO_2$, $H_2S$, etc).

After the reaction stage (i.e. the WGS stage), a regeneration stage may be applied. Hence, in a specific embodiment, the process of the invention further comprises an adsorbent regeneration stage, wherein $CO_2$ and optionally the acid gas component are at least partially removed from the adsorbent 10. Regeneration may be applied by pressure-swing and/or thermal swing, processes known in the art. Pressure-swing herein also comprises partial pressure swing, i.e. the partial pressure of a gas component is controlled. During the regeneration stage steam may be provided to the adsorbent 10. Hence, the partial pressure of $H_2O$ may be increased in the reactor 1. In this way, $CO_2$ and $H_2S$ and/or other acid gas components may substantially release from the adsorbent 1. Other gases, like $N_2$ or Air could also be used; in a pressure swing unit the sorbent can also be regenerated using $CO_2$. Combinations of two or more gasses may also be applied. The off-gasses may be released from the reactor 1, for instance via an exhaust 107, such as via a further outlet 106 to exhaust 107. The regeneration stage is preferably be performed at a temperature in the range of about 200-600° C., even more preferably above about 250° C., yet even more preferably in a range of about 300-500° C. The reaction stage and regeneration stage may be performed in a cyclic way, wherein the reaction stage is followed by one or more regeneration stages. Outlets 105 and 106 may also be connected to a parallel reactor 1 (see above) for e.g., pressure equalisation.

Therefore, the invention also provides the use of an alkali promoted alumina based material, i.e. adsorbent 10, for the removal of acid gas components of a gas mixture 200 comprising (a) a sulphur containing compound selected from the group consisting of $H_2S$, COS, $CS_2$ and $SO_x$ and (b) another compound selected from the group consisting of HCN, $NO_x$ and HCl. More especially, the invention provides the use of an alkali promoted alumina based material for the removal of acid gas components of a gas mixture comprising acid gas components, wherein the acid gas components comprise $H_2S$ and one or more components selected from the group consisting of $H_2S$, $CO_2$, HCN, COS, $CS_2$, $NO_x$, $SO_x$ and HCl. Especially, the acid gas components at least comprise $H_2S$ and $CO_2$. Hence, the adsorbent 10 may also be used for the co-adsorption of $CO_2$ and $H_2S$ in gas mixtures. Therefore, such adsorbent 10 may be used for the purification of natural gas.

Thus, in an embodiment, the adsorbent 10 may be used for the simultaneous removal of one or more sulphur containing acid gas components, especially $H_2S$, and $CO_2$ and (for performing) the water gas shift reaction of CO and $H_2O$ from the gas mixture 200 comprising CO, $CO_2$, $H_2O$ and sulphur containing acid gas components, especially $H_2S$.

EXAMPLES

Examples were performed, with gas mixtures 200 with compositions as described in the above table, and under the therein indicated conditions.

Figure 2A:
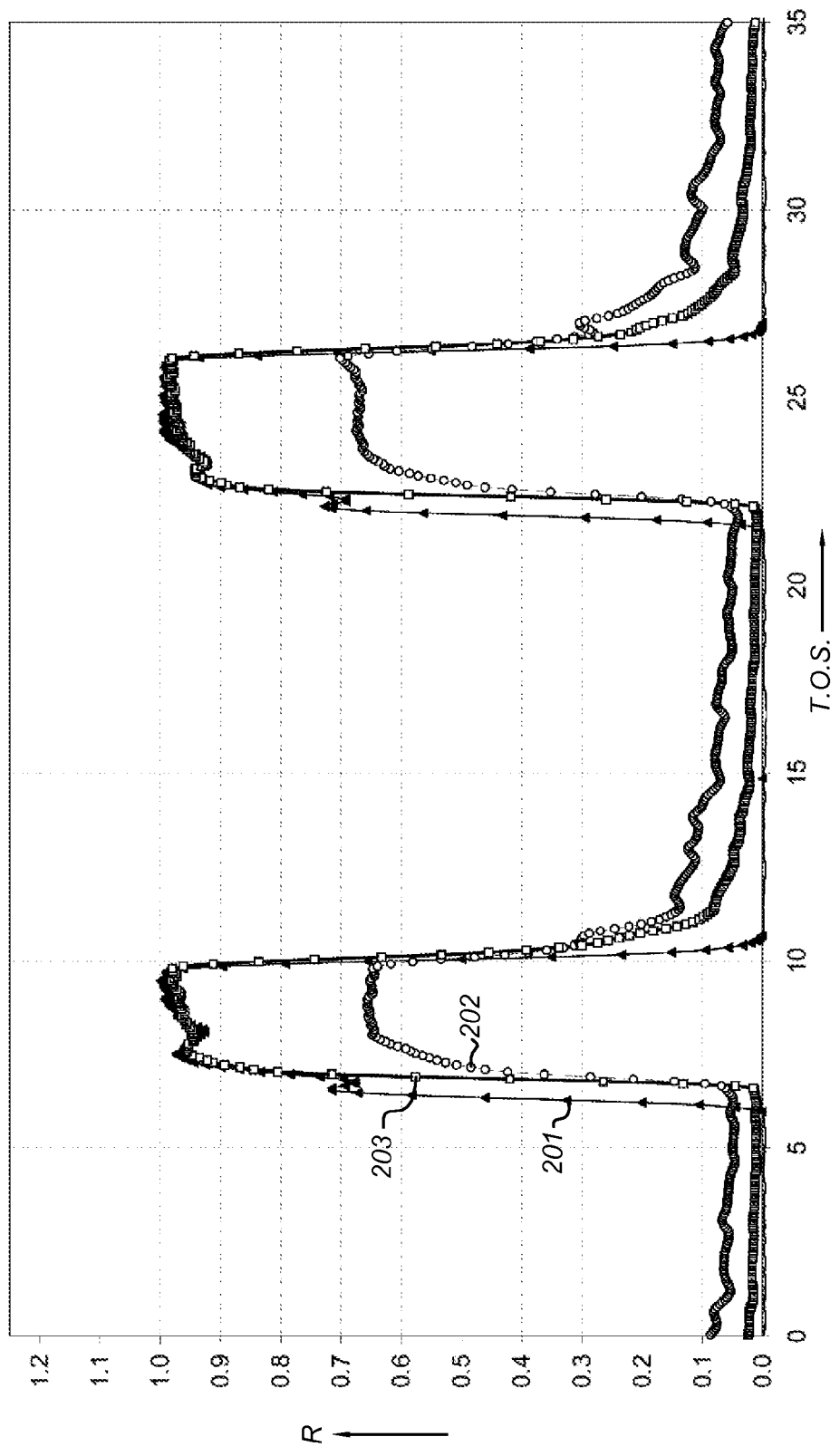
FIGS. 2a-2e show experimental results.
Figure 2B:
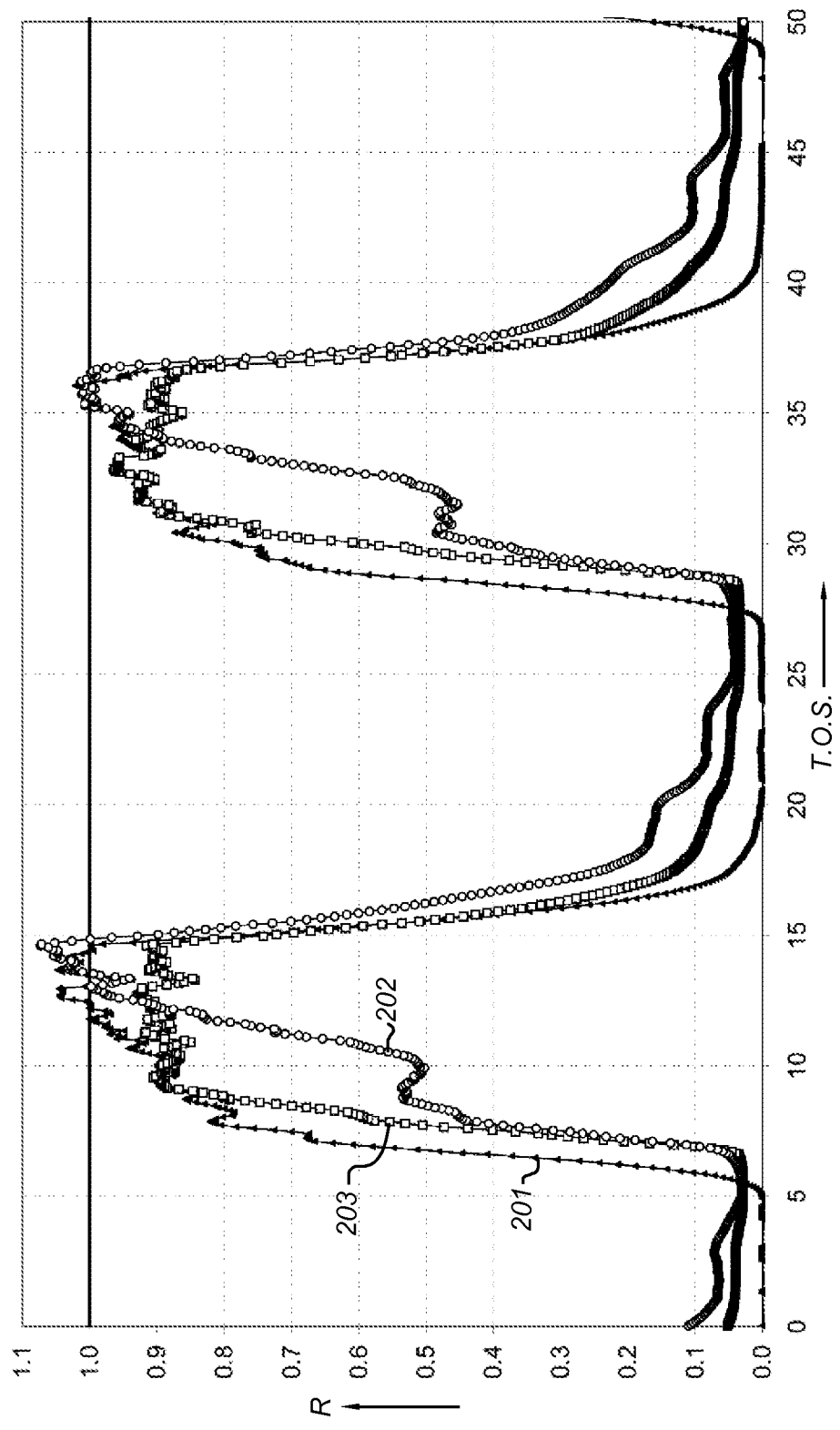
Figure 2C:
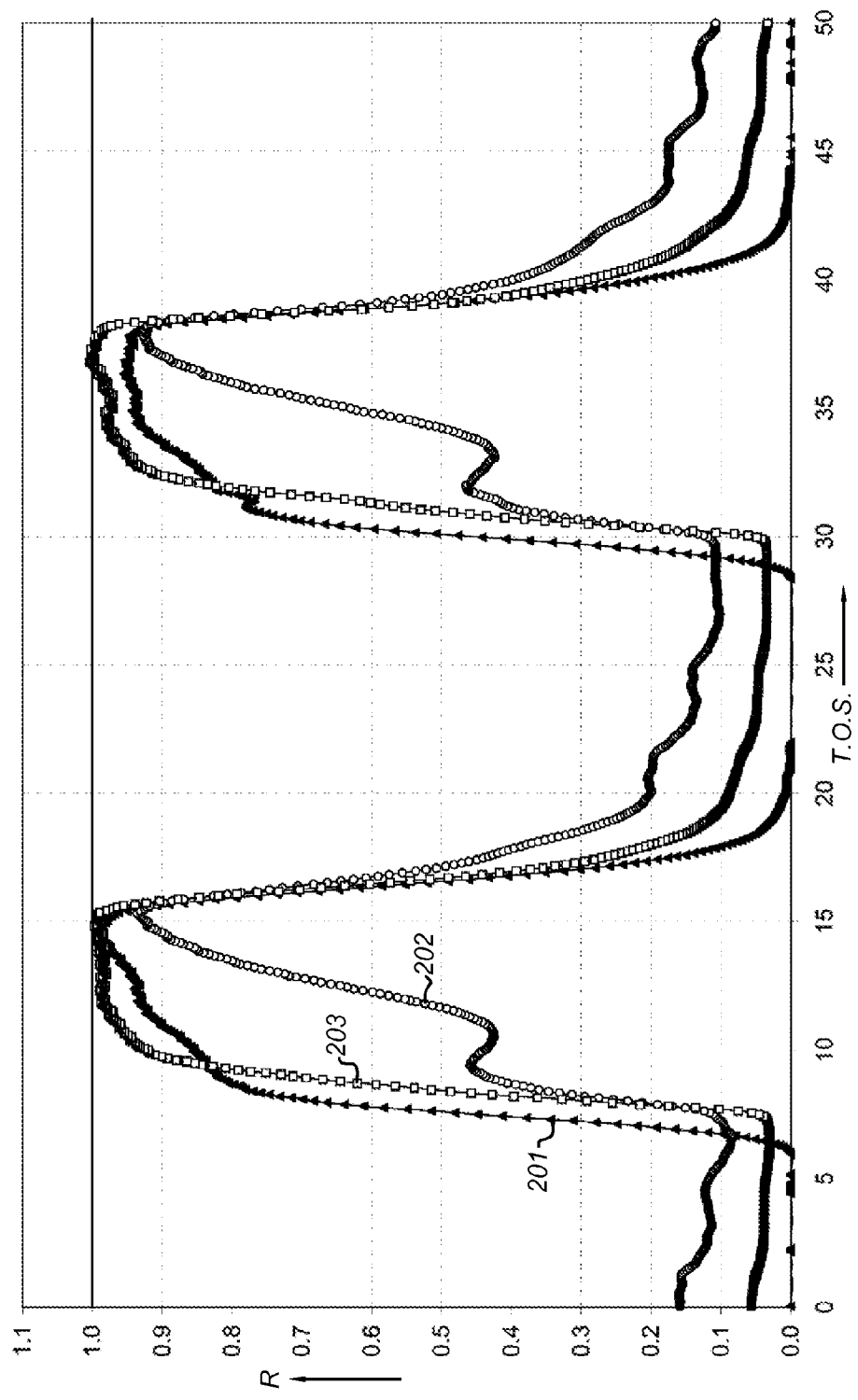
Figure 2D:
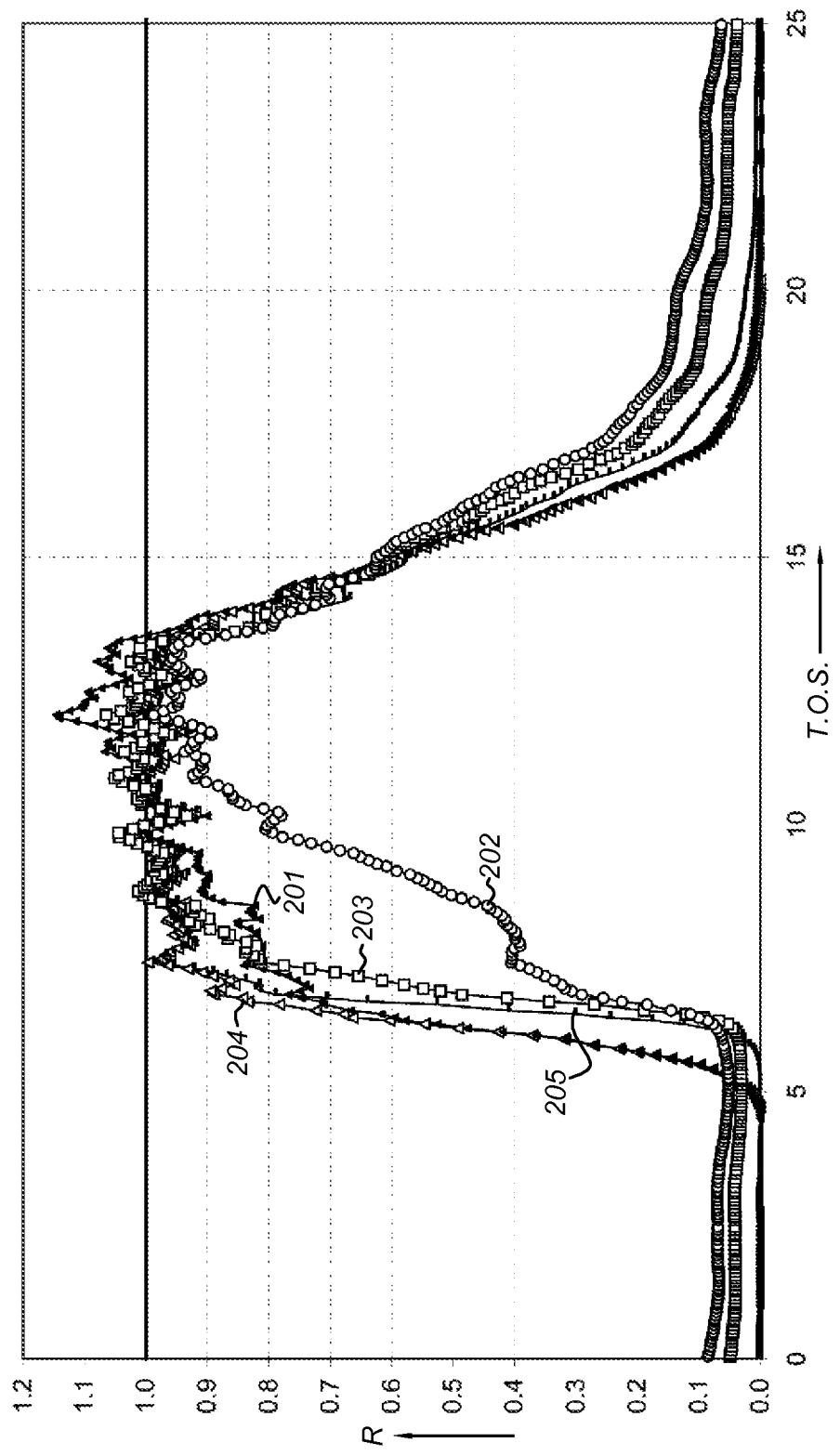
Figure 2E:
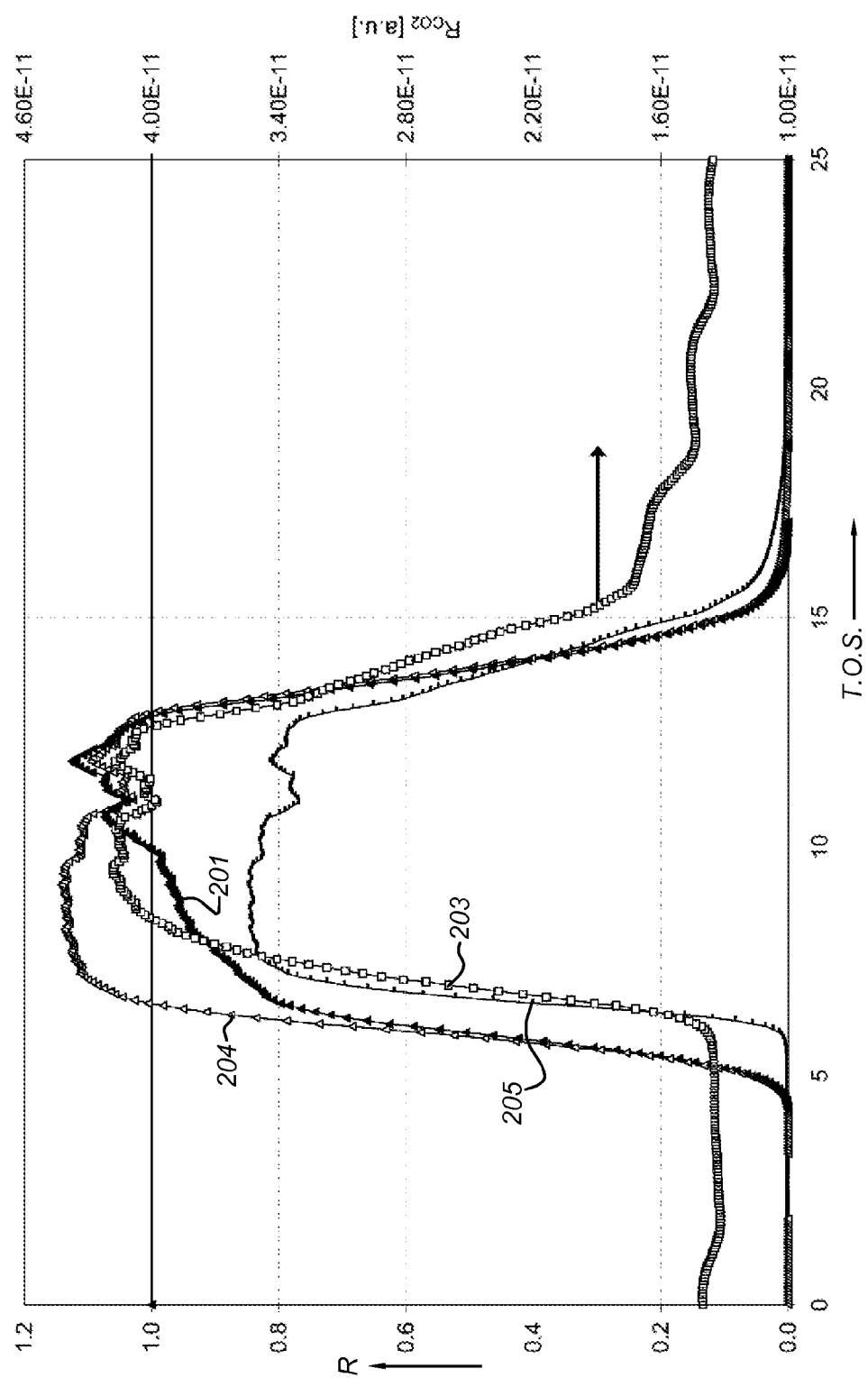

FIGS. 2a-2e show a number of experiments, wherein on the x-axis the number of cycles (i.e. a time scale with time on stream (T.O.S.) in minutes) is indicated, and on the y-axis the normalized response is indicated. In FIG. 2e, on the right y-axis, the non-normalized $CO_2$-response is indicated in arbitrary units. From these data it can be concluded that there is co-adsorption of $CO_2$ and $H_2S$. Further, it appears that the material has water gas shift activity while still having the ability to co-adsorb $CO_2$ and $H_2S$, even after initial saturation with $CO_2$.

In FIG. 2a, the sorbent is periodically exposed to $He/H_2S/CO_2/H_2O$ and $H_2O/N_2$ at conditions specified in the table above. The responses for He, $H_2S$ and $CO_2$ are represented by 201, 202 and 203, respectively. The response of the inert tracer 201 is added as reference for the hydrodynamics of the experimental reactor. From this figure it can be concluded that there is a reversible co-adsorption of $CO_2$ and $H_2S$ because of the reproducible delayed responses for 202 and 203 with respect to 201. If there was no adsorption taking place then $CO_2$ and $H_2S$ would breakthrough at the same time as the non-reactive trace gas He. This is clearly not the case. If there was no co-adsorption the $CO_2$ and $H_2S$ would breakthrough at different times relative to the tracer gas. It is clear to those skilled in the art that this is not the case.

In FIG. 2b, the experiment is repeated at 5 bara pressure (instead of 2 bara in FIG. 2a). From this figure it can again be concluded that there is reversible co-adsorption of $CO_2$ and $H_2S$. The number of sites for $CO_2$ and $H_2S$ adsorption may increase in the same fashion as a function of pressure, thus there is more evidence of true co-adsorption.

In FIG. 2c, experiment 2b is repeated using a halved $H_2S$ content. Despite the lower $H_2S$ content, there still is reversible co-adsorption of $CO_2$ and $H_2S$. The $CO_2$ and $H_2S$ still breakthrough at the same time relative to each other. The FIGS. 2a-2c taken together show that co-adsorption is occurring.

In FIG. 2d, the sorbent is periodically exposed to $H_2S$ rich syngas and $H_2O/N_2$ at conditions specified in the table above. The responses for $H_2$ and CO are represented by 204 and 205 respectively. Besides the evident reversible co-adsorption of $CO_2$ and $H_2S$, it can be concluded that the sorbent is active for the WGS reaction. This is apparent from the delayed response for 205 compared to that of the inert tracer 201. While the sorbent is adsorbing $CO_2$ and $H_2S$, it simultaneously converts CO into $CO_2$ via the WGS reaction. The resulting $CO_2$ is immediately adsorbed. Accordingly, 205 displays breakthrough at about the same time as 202 and 203.

In FIG. 2e, the sorbent is periodically exposed to i) syngas free of $CO_2$ and $H_2S$ and ii) $H_2O/N_2$ at conditions specified in the table above. In agreement with the experiment of FIG. 2d, it can be concluded that the WGS reaction proceeds to completion in the period before the sorbent is saturated by $CO_2$. Moreover, the sorbent displays some WGS activity following breakthrough of $CO_2$. This is evidenced by the observation that the $H_2$ response is higher than in the feed, while the CO response is lower than in the feed.

OTHER EXAMPLES

Other examples of promoted alumina based materials are for instance selected from K—$Al_2O_3$, Cs—$Al_2O_3$, K—MgO—$Al_2O_3$, Li—MgO—$Al_2O_3$, K—MnO—$Al_2O_3$, K—Fe—$Al_2O_3$ Li—HTC, K—(Mn—Al)HTC, K—(Fe—Al)HTC (with HTC being hydrotalcite).

Alumina promoted with potassium was tested for its $CO_2$ capacity. The alumina (γ-$Al_2O_3$) was promoted by impregnation with a solution of potassium carbonate as follows: the material was first dried at 80° C. for 16 h and 5.0 g of dried material were further impregnated by incipient wetness method with a aqueous solution containing 1.41 g of $K_2CO_3$. The resulting wet powder was dried at 120° C. for 16 h. Further, alumina was also promoted with potassium and magnesium, potassium and iron or potassium and manganese according to the following procedures:

Mg,K—$Al_2O_3$: γ-$Al_2O_3$ was dried at 80° C. for 16 h. 6.37 g $Mg(NO_3)_2.6H_2O$ dissolved in 5.70 g deionised water were used for impregnating 9.00 g of γ-$Al_2O_3$. The resulting wet powder was dried at 120° C. for 16 h and further calcined at 400° C. for 4 hours. 5.00 g of the resulting material were further impregnated by incipient wetness method with an aqueous solution containing 1.41 g of $K_2CO_3$. The resulting wet powder was dried at 120° C. for 16 h.

Fe,K—$Al_2O_3$: γ-$Al_2O_3$ was dried at 80° C. for 16 h. 8.48 g $Fe(NO_3)_3.9H_2O$ dissolved in 5.70 g deionised water were used for impregnating 9.00 g of γ-$Al_2O_3$. The resulting wet powder was dried at 120° C. for 16 h and further calcined at 400° C. for 4 hours. 5.00 g of the resulting material were further impregnated by incipient wetness method with an aqueous solution containing 1.41 g of $K_2CO_3$. The resulting wet powder was dried at 120° C. for 16 h.

Mn,K—$Al_2O_3$: γ-$Al_2O_3$ was dried at 80° C. for 16 h. 6.23 g $Mn(NO_3)_2.4H_2O$ dissolved in 5.70 g deionised water were used for impregnating 9.00 g of γ-$Al_2O_3$. The resulting wet powder was dried at 120° C. for 16 h and further calcined at 400° C. for 4 hours. 5.00 g of the resulting material were further impregnated by incipient wetness method with an aqueous solution containing 1.41 g of $K_2CO_3$. The resulting wet powder was dried at 120° C. for 16 h.

The $CO_2$ sorption capacities were measured under the following conditions:

2 grams of the material in a U-shaped glass reactor were first treated with a flow of $N_2$ with 10.7% water at 400° C. during one hour. Then, $CO_2$ was added to the gas mixture for 45 minutes (gas mixture: 5.8% $CO_2$, 10.7% $H_2O$ and balance $N_2$). Desorption stage under a flow of $N_2$ with 10.7% water was then carried out at 400° C. for one hour. This adsorption/ desorption cycle was repeated two times, while the $CO_2$ flow in the outlet was continuously monitored using the mass spectrometer.

The following table summarises the $CO_2$ adsorption capacities measured after the third cycle for the corresponding compounds:

| Material | $CO_2$ capacity (mmol/g) |
|---|---|
| K—$Al_2O_3$ | 0.27 |
| Mg,K—$Al_2O_3$ | 0.35 |
| Fe,K—$Al_2O_3$ | 0.39 |
| Mn,K—$Al_2O_3$ | 0.26 |

FURTHER EXAMPLE

Further examples were performed, amongst others with the following gas compositions:

TABLE 2

| supplementary example gas compositions | | | | | | |
|---|---|---|---|---|---|---|
| | GC1 | GC2 | GC3 | GC4 | GC5 | GC6 |
| $CO_2$ (vol %) | 10.7 | 10.7 | — | 20 | — | 50 |
| CO (vol %) | — | — | — | — | — | — |
| $H_2S$ (vol %) | 0.05 | — | — | — | — | — |
| $H_2$ (vol %) | — | — | — | — | — | — |
| $H_2O$ (vol %) | 17.1 | 17.1 | 17.1 | 20 | 100 | 50 |
| $N_2$ (vol %) | 32.1 | 32.1 | — | 60 | — | — |
| He (vol %) | 40 | 40 | 40 | — | — | — |
| Ar (vol %) | — | — | 42.9 | — | — | — |
| P (bar) | 1 | 1 | 1 | 28 | 1 | 10 |
| T (° C.) | 400 | 400 | 400 | 400 | 400 | 400 |

Three materials are chosen for comparison:
$Mg_{0.81}Al_{0.19}(OH)_2(CO_3)_{0.095} \cdot 0.13[K_2CO_3]$ (HTC1);
$Mg_{0.45}Al_{0.55}(OH)_2(CO_3)_{.275} \cdot 0.13[K_2CO_3]$ (HTC2); and
$Al_2O_3 \cdot 0.185[K_2CO_3]$ (ALO1)

Table 2 shows some gas sample compositions and conditions. Table 3 shows a comparison between breakthrough capacities measured when moving from Gas Composition GC3 to GC2, compared to GC3 to GC1. The materials were exposed to condition GC3 for at least 2 hours before switching to the second gas composition. All three materials show decreased $CO_2$ breakthrough capacities in the presence of $H_2S$ compared to its absence. However, the hydrotalcite based materials, HTC1 and HTC2, have higher $CO_2$ breakthrough capacity in the presence of $H_2S$ than ALO1.

TABLE 3

| Capacities of fresh material | | |
|---|---|---|
| | Breakthrough Capacity for different cycle shifts | |
| | GC3 → GC2 | GC3 → GC1 |
| HTC1 | 0.38 mmol/g | 0.29 mmol/g |
| HTC2 | 0.41 mmol/g | 0.26 mmol/g |
| ALO1 | 0.37 mmol/g | 0.23 mmol/g |

After breakthrough of $CO_2$ and $H_2S$ under the conditions shown above, i.e. GC3 to GC1, the composition of the gas was analysed with mass spectrometry (MS). It was seen that there were trace amount of $SO_2$ present in all cases after breakthrough, table 4 shows the ratio of the measured ion currents from the MS for the different mass components; mass 34 ($H_2S$) and mass 64 ($SO_2$) compared to mass 44 ($CO_2$). It is clear that both ALO1 and HTC2 produce a higher amount of $SO_2$ after breakthrough than both HTC1. However, $SO_2$ can lead to the formation of $Al_2(SO_4)_3$ in alumina based materials, effectively shortening their useful life as sorbents.

TABLE 4

| Gas compositions after breakthrough | | |
|---|---|---|
| | Ion Current ratios from MS for different components | |
| | 44 ($CO_2$):34 ($H_2S$) | 44 ($CO_2$):64 ($SO_2$) |
| HTC1 | 310 | 2940 |
| HTC2 | 333 | 1000 |
| ALO1 | 323 | 1050 |

An experiment was performed where multiple cycles were repeated, switching from GC1 or GC2 to GC3 every 25 minutes, and back again. In these experiments $CO_2$ and $H_2S$ break through at the same time. This experiment was also repeated for a cycle time of 10 minutes. The cyclic capacities, averaged over 5 cycles, under these conditions for HTC2 and ALO1 are shown in table 5. HTC2 outperforms ALO1 in these cyclic tests. At short cycle times, there is little to no difference in the $CO_2$ cyclic capacity of HTC2 with or without $H_2S$.

TABLE 5

| Cyclic capacity for different cycle times switching from gas compositions | | | |
|---|---|---|---|
| | Cyclic capacity (without $H_2S$) GC2 to GC3 | | Cyclic Capacity (with $H_2S$) GC1 to GC3 |
| | Cycle Time | | |
| | 25 minutes | 10 minutes | 25 minutes | 10 minutes |
| HTC2 | 0.26 mmol/g | 0.20 mmol/g | 0.25 mmol/g | 0.20 mmol/g |
| ALO1 | 0.18 mmol/g | 0.16 mmol/g | 0.17 mmol/g | 0.14 mmol/g |

Pellets of HTC1 and HTC2 were prepared for loading in a 2 m long reactor, with 38 mm internal diameter. The reactor was heated to 400° C., and the material exposed to gas compositions GC4 and GC5 in a cyclic manner for more than 1000 cycles. The crush strength of the pellets was determined before and after the experiment, as shown in table 6. HTC1 had lost its mechanical strength and had been degraded to a powder. HTC2 became weaker but still remain mechanically robust.

When HTC1 is exposed to relatively high pressure steam and $CO_2$, GC6, x-ray diffraction spectrometry (XRD) reveals that significant amount of Mg in the hydrotalcite is converted to $MgCO_3$. However, when HTC2 is exposed to the same conditions, very little $MgCO_3$ is seen in XRD. $MgCO_3$ has a much larger crystal volume than for example MgO, which is seen in the XRD measurements under ambient conditions. No $MgCO_3$ formation occurs in HTC1 when the partial pressure of steam is lower than 2 bars, on exposure to $CO_2$. HTC1 can thus be used when the partial pressure of steam is below 2 bars for the simultaneous removal of $H_2S$ and $CO_2$ with combined water gas shift activity. HTC2 can be used even when the partial pressure of steam is above 2 bars for simultaneous removal of $H_2S$ and $CO_2$ combined with water gas shift activity.

TABLE 6

Material Strength: Crush strength in Newton after more than 1000 cycles (GC4 → GC5)

|  | Initial Strength | Final Strength |
|---|---|---|
| HTC1 | 195 ± 27 | — |
| HTC2 | 323 ± 79 | 261 ± 69 |

The final strength of HTC1 was substantially lower than the initial strength. The final strength of HTC2 was lower than the initial strength, but still very high, and still even substantially above the initial strength of HTC1. Wherefrom, it seems that Mg-low materials may be preferred.

Hence, in an embodiment the invention provides a water gas shift process comprising a reaction stage comprising (a) providing a gas mixture comprising CO, H$_2$O and an acid gas component to a reactor containing an adsorbent, wherein the adsorbent comprises an alkali promoted alumina based material and (b) subjecting the gas mixture to water gas shift reaction conditions to perform the water gas shift reaction, wherein the acid gas component comprises H$_2$S, and wherein the gas mixture comprises a H$_2$S reactor inlet concentration of preferably at least 200 ppm H$_2$S relative to the gas mixture.

Further, the invention provides such process, wherein the acid gas component further comprises one or more components selected from the group consisting of HCN, COS, CS$_2$, NO$_x$, SO$_x$ and HCl.

In addition, the invention provides such process, wherein subjecting the gas mixture to water gas shift reaction conditions to perform the water gas shift reaction comprises subjecting the gas mixture to a temperature in the range of 300-600° C.

Yet, the invention provides such process, wherein the adsorbent comprises potassium promoted alumina or hydrotalcite.

In addition, the invention provides such process, wherein the adsorbent is further promoted with one or more elements selected from the group consisting of Mg, Mn, Ag, Cu, Co, Pb, Fe and Cd, especially selected from Mg, Fe and Mn.

Further, the adsorbent may comprises an alkaline earth alkali promoted alumina or hydrotalcite.

Yet, the invention provides such process, wherein the adsorbent comprises magnesium alkali promoted alumina or hydrotalcite.

Especially, the adsorbent comprises an alkali promoted hydrotalcite having the chemical formula $$[M^{II}_{(1-x)}Al_{(\alpha x)}M^{III}_{((1-\alpha)x)}(OH)_2]$$
$$[C^{n-}]_{(x/n)} \cdot yH_2O \cdot zM^I_{(m)}A^{m-}$$

wherein

M$^I$ is one or more selected from the group consisting of Li, Na, K, Rb and Cs;

M$^{II}$ is one or more selected from the group consisting of Mg, Mn, Cu, Co, Fe, Cd and Cr;

Al is aluminium;

M$^{III}$ is optionally one or more of the group consisting of Fe, Cr and Mn;

C$^{n-}$ is one or more anions selected from the group consisting of NO$_3^-$, SO$_4^{2-}$, CO$_3^{2-}$, CH$_3$CO$_2^-$, Br$^-$, F$^-$ and I$^-$;

A$^{m-}$ is one or more anions, such as selected from CO$_3^{2-}$, CH$_3$CO$^{2-}$, C$_2$O$_4^{2-}$, NO$_3^-$, SO$_4^{2-}$, CO$_3^{2-}$, CH$_3$CO$_2^-$, OH$^-$, Cl$^-$, Br$^-$, F$^-$ and I$^-$ etc. . . . .

n=1 or 2; x=0.01-0.99; y=0-4; z=0.001-7; and α=0.5-1.

Yet, the invention provides such process, wherein the reactor further contains a water gas shift catalyst, wherein the weight ratio of the adsorbent to catalyst is ≥5.

In an embodiment, the reactor does not contain a further catalyst.

The invention further provides the use of an alkali promoted alumina based material for the removal of acid gas components of a gas mixture comprising acid gas components, wherein the acid gas components comprise H$_2$S and one or more components selected from the group consisting of CO$_2$, HCN, COS, CS$_2$, NO$_R$, SO$_x$ and HCl.

The invention further provides such use, wherein the acid gas components at least comprise H$_2$S and CO$_2$.

Yet, the invention provides such use, wherein the gas mixture further comprises CO and H$_2$O, for the simultaneous removal of H$_2$S and CO$_2$ and the water gas shift reaction of CO and H$_2$O from the gas mixture.

In addition, the invention provides such use, wherein the gas mixture comprises coal-derived synthesis gas.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The arrangement herein is amongst others described during operation. As will be clear to the person skilled in the art, the invention is not limited to methods of operation or arrangements in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A water gas shift process comprising:
   (a) providing a gas mixture comprising CO, H$_2$O and an acid gas component to a reactor comprising an adsorbent,
      wherein the adsorbent comprises a metal oxide comprising alumina, magnesia, and an alkali metal,
      wherein the reactor does not comprises a catalyst, and
      where the acid gas component comprises at least 200 ppm H$_2$S relative to the gas mixture, and
   (b) subjecting the gas mixture to water gas shift reaction conditions to perform the water gas shift reaction.

2. The process according to claim 1, wherein the volume of $H_2O$ in the gas mixture is at least 1.5 times the volume of CO.

3. The process according to claim 1, wherein the acid gas component further comprises one or more components selected from the group consisting of HCN, COS, $CS_2$, $NO_x$, $SO_x$ and HCl.

4. The process according to claim 1, wherein the gas mixture is subjected to water gas shift reaction conditions at a temperature in the range of 300-600° C.

5. The process according to claim 1, wherein the alkali metal comprises potassium.

6. The process according to claim 1, wherein the gas mixture comprises coal-derived synthesis gas.

7. A water gas shift process comprising:
(a) providing a gas mixture comprising CO, $H_2O$ and an acid gas component to a reactor comprising an adsorbent and optional catalyst,
where the adsorbent comprises a metal oxide comprising alumina, magnesia, and an alkali metal,
wherein the weight ratio of adsorbent to any catalyst is greater than 10, and
wherein the acid gas component comprises at least 200 ppm $H_2S$ relative to the gas mixture, and
(b) subjecting the gas mixture to water gas shift reaction conditions to perform the water gas shift reaction, wherein the adsorbent is derived from an alkali promoted hydrotalcite having the chemical formula:

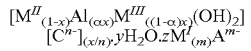

wherein
$M^I$ is one or more selected from the group consisting of Li, Na, K, Rb and Cs;
$M^{II}$ comprises Mg and, optionally, further comprises one or more of Mn, Cu, Co, Fe, Cd and Cr;
Al is aluminium;
$M^{III}$ is optionally one or more of the group consisting of Fe, Cr and Mn;
$C^{n-}$ is one or more anions selected from the group consisting of $NO_3^-$, $SO_4^{2-}$, $CO_3^{2-}$, $CH_3CO_2^-$, $Cl^-$, $Br^-$, $F^-$ and $I^-$;
$A^{m-}$ is one or more anions,
n=1 or 2; x=0.01-0.99; y=0-4; z=0.001-7; and α=0.5-1.

8. The process according to claim 7, wherein x=0.3-0.7.

9. The process according to claim 7, wherein the adsorbent comprises potassium and has a ratio Mg:Al in the range of 30:70-70:30.

10. The process according to claim 7, wherein $M^I$ comprises potassium.

11. The process according to claim 7, wherein $A^{m-}$ is one or more of $CO_3^{2-}$, $CH_3CO^{2-}$, $C_2O_4^{2-}$, $NO_3^-$, $SO_4^{2-}$, $CO_3^{2-}$, $CH_3CO_2^-$, $OH^-$, $Cl^-$, $Br^-$, $F^-$ and $I^-$.

* * * * *